United States Patent
Merulla

(10) Patent No.: US 12,466,487 B2
(45) Date of Patent: Nov. 11, 2025

(54) FRONT FRAME ASSEMBLY FOR A MOTOR VEHICLE

(71) Applicant: FERRARI S.P.A., Modena (IT)

(72) Inventor: Andrea Merulla, Modena (IT)

(73) Assignee: FERRARI S.P.A., Modena (IT)

( * ) Notice: Subject to any disclaimer, the term of this patent is extended or adjusted under 35 U.S.C. 154(b) by 349 days.

(21) Appl. No.: 18/354,690

(22) Filed: Jul. 19, 2023

(65) Prior Publication Data

US 2024/0025481 A1   Jan. 25, 2024

(30) Foreign Application Priority Data

Jul. 20, 2022   (IT) .......................... 102022000015261

(51) Int. Cl.
  *B62D 21/15*   (2006.01)
  *B62D 21/11*   (2006.01)
  *B60L 50/60*   (2019.01)

(52) U.S. Cl.
  CPC ............ *B62D 21/152* (2013.01); *B62D 21/11* (2013.01); *B60L 50/60* (2019.02)

(58) Field of Classification Search
  CPC ..... B62D 21/11; B62D 21/152; B62D 21/155
  See application file for complete search history.

(56) References Cited

U.S. PATENT DOCUMENTS

| | | | | |
|---|---|---|---|---|
| 9,422,004 B2* | 8/2016 | Fujihara | ............... | B62D 21/152 |
| 9,643,651 B2* | 5/2017 | Dressel | ............... | B22D 21/007 |
| 9,855,975 B2* | 1/2018 | Amemiya | ............... | B62D 21/00 |
| 10,071,768 B2* | 9/2018 | Yasuhara | ............... | B60K 6/20 |
| 10,494,028 B2* | 12/2019 | Madasamy | ............ | B60R 19/24 |
| 11,130,530 B2* | 9/2021 | Dettling | ............... | B62D 29/008 |
| 11,173,963 B2* | 11/2021 | Matsuoka | ............ | B62D 21/152 |
| 11,472,482 B2* | 10/2022 | Tashiro | ............... | B62D 21/152 |
| 11,529,996 B2* | 12/2022 | Shimoda | ............. | B62D 21/152 |
| 11,608,116 B2* | 3/2023 | Yotsuyanagi | ........ | B62D 21/157 |
| 12,012,151 B2* | 6/2024 | Chino | .................... | B62D 25/08 |
| 12,134,422 B2* | 11/2024 | Kawano | ............. | B62D 27/00 |
| 12,168,382 B2* | 12/2024 | Testa | .................... | B60G 7/008 |

(Continued)

FOREIGN PATENT DOCUMENTS

KR   20130123810 A   11/2013

OTHER PUBLICATIONS

Italian Search Report for Application No. 102022000015261, Filing Date: Jul. 20, 2022; Date of Mailing: Mar. 6, 2023, 7 pages.

*Primary Examiner* — Jeffrey J Restifo
(74) *Attorney, Agent, or Firm* — CANTOR COLBURN LLP

(57) ABSTRACT

Front frame assembly for a motor vehicle comprising a suspension attachment structure, which can be fixed to a body cell of the motor vehicle defining a passenger compartment of said motor vehicle; and an absorption element adapted to absorb the energy associated with a front crash of the motor vehicle; the absorption element being distinct from the structure, being fixed to the latter and extending along a first direction. The structure comprises a first opening adapted to be passed through by a component of a steering system of the motor vehicle, a second opening having an elongated shape along a second direction transversal to the first direction; and at least one third opening opposite the second opening with respect to the first opening.

10 Claims, 4 Drawing Sheets

(56) References Cited

U.S. PATENT DOCUMENTS

| | | | |
|---|---|---|---|
| 12,377,916 B2* | 8/2025 | Testa | B62D 25/08 |
| 2016/0159399 A1* | 6/2016 | Yasuhara | B62D 25/082 |
| | | | 180/292 |
| 2023/0174159 A1* | 6/2023 | Park | B60R 19/48 |
| | | | 296/187.09 |
| 2024/0025481 A1* | 1/2024 | Merulla | B62D 25/08 |
| 2024/0067269 A1* | 2/2024 | Tachibana | B62D 25/08 |
| 2025/0128764 A1* | 4/2025 | Ishihara | B62D 25/082 |
| 2025/0128765 A1* | 4/2025 | Ishihara | B62D 21/02 |

* cited by examiner

FRONT FRAME ASSEMBLY FOR A MOTOR VEHICLE

CROSS-REFERENCE TO RELATED APPLICATIONS

This patent application claims priority from Italian patent application no. 102022000015261 filed on Jul. 20, 2022, the entire disclosure of which is incorporated herein by reference.

TECHNICAL FIELD

The invention relates to a front frame assembly comprising a suspension attachment structure for a motor vehicle.

BACKGROUND

As it is known, the front portion of the frame of motor vehicles has both a supporting function for supporting body elements and an absorption function for absorbing front crashes, namely those crashes taking place along the forward moving direction of the motor vehicle.

In particular, in order to absorb front crashes, the frame includes an absorption structure—known as "crash box"—which includes a pair of collapsible elements extending parallel to the longitudinal direction of the vehicle.

Said collapsible elements—for example in the form of extruded aluminium elements—are deformable along the forward moving direction of the vehicle relative to compression stresses. In detail, in response to a front crash, said collapsible elements deform, absorbing the energy of the crash, and the speed of the motor vehicle progressively becomes zero, namely according to a deceleration defined during the designing phase.

Generally speaking, the ability of the collapsible elements to absorb crashes is proportional to their length along the longitudinal direction of the vehicle. Therefore, the absorption of front crashes by the collapsible elements is correlated with the front projection of the vehicle, namely the distance between the front end of the vehicle and the axis of the front wheels along the longitudinal direction of the vehicle.

In motor vehicles with a heat engine arranged at the front, the front portion has dimensions that are sufficient to accommodate the heat engine. As a consequence, the front projection generally is such as to allow for the installation of collapsible elements that are long enough to effectively absorb front crashes.

However, in electric motor vehicles or in motor vehicles provided with a heat engine arranged at the back, for example in some sports cars, the front projection mostly is smaller than the one of motor vehicles provided with a heat engine arranged at the front.

In motor vehicles characterized by a small-sized front projection, the length of the collapsible elements is very limited and is not always sufficient to allow for an efficient absorption of front crashes. In addition, the extension of said elements is limited by the presence of a structure known as "shock tower", which is designed to accommodate the attachments of the suspensions of the motor vehicle and from which the collapsible elements extend.

The shock tower is typically obtained by means of casting processes. As a consequence, due to the defects and to the normally weaker mechanical features of casting products compared to components obtained by means of other process, it is hard to foresee the tensile strength behaviour of the shock tower.

Owing to the above, known motor vehicles need to be improved in order to efficiently foresee their ability to absorb front crashes.

The object of the invention is to fulfil the need discussed above, preferably in a simple and reliable fashion.

DESCRIPTION OF THE INVENTION

Said object is reached by a front frame assembly for a motor vehicle as defined in claim 1.

The dependent claims define special embodiments of the invention.

BRIEF DESCRIPTION OF THE DRAWINGS

Hereinafter, an embodiment of the invention will be described, in order to allow the latter to be better understood, by way of non-limiting example and with reference to the accompanying drawings, wherein.

EMBODIMENTS OF THE INVENTION

Figure 1:
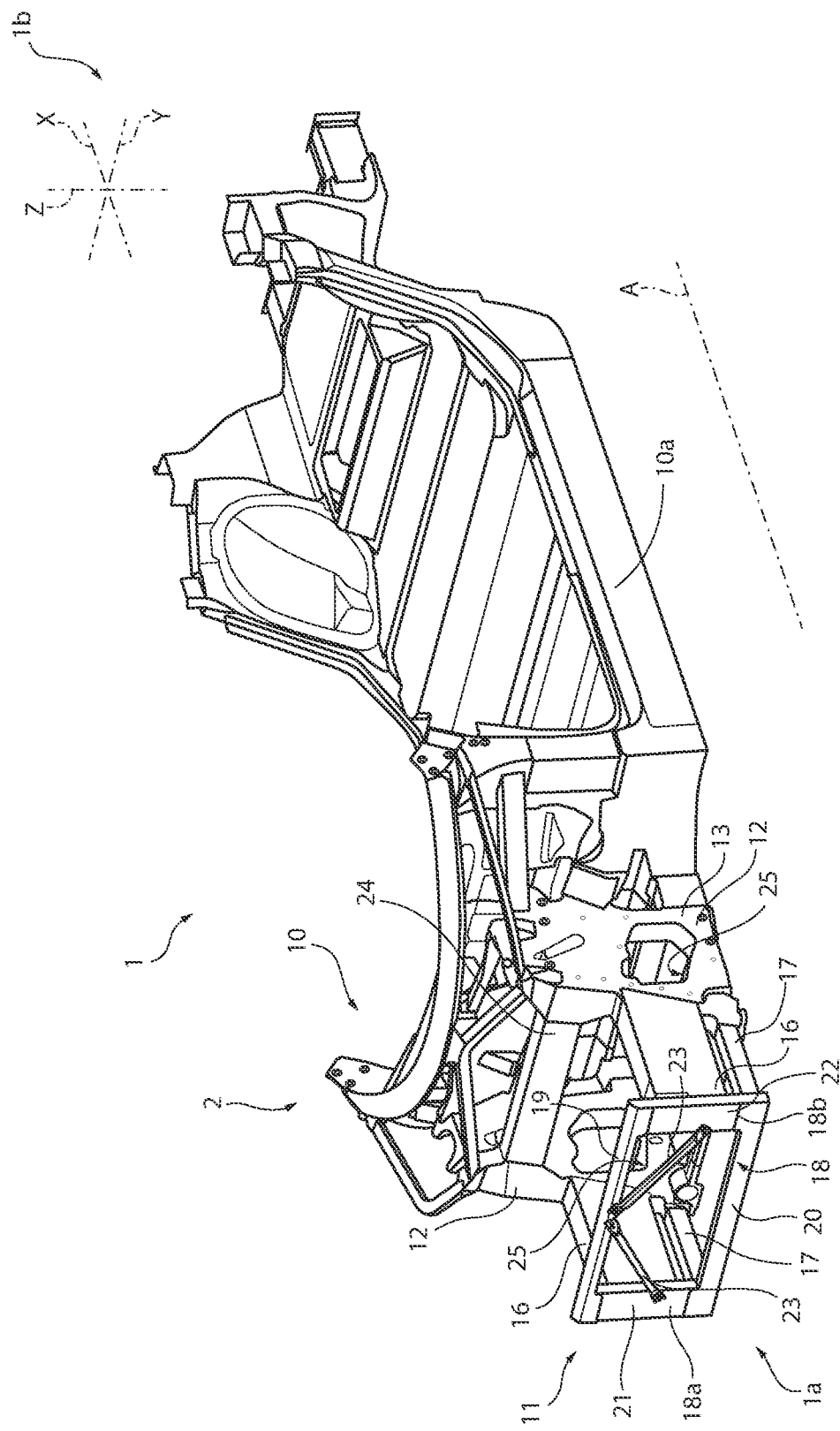
FIG. 1 is a schematic perspective view of the frame of a motor vehicle comprising a front frame assembly according to the invention and with parts removed for greater clarity.
Figure 2:
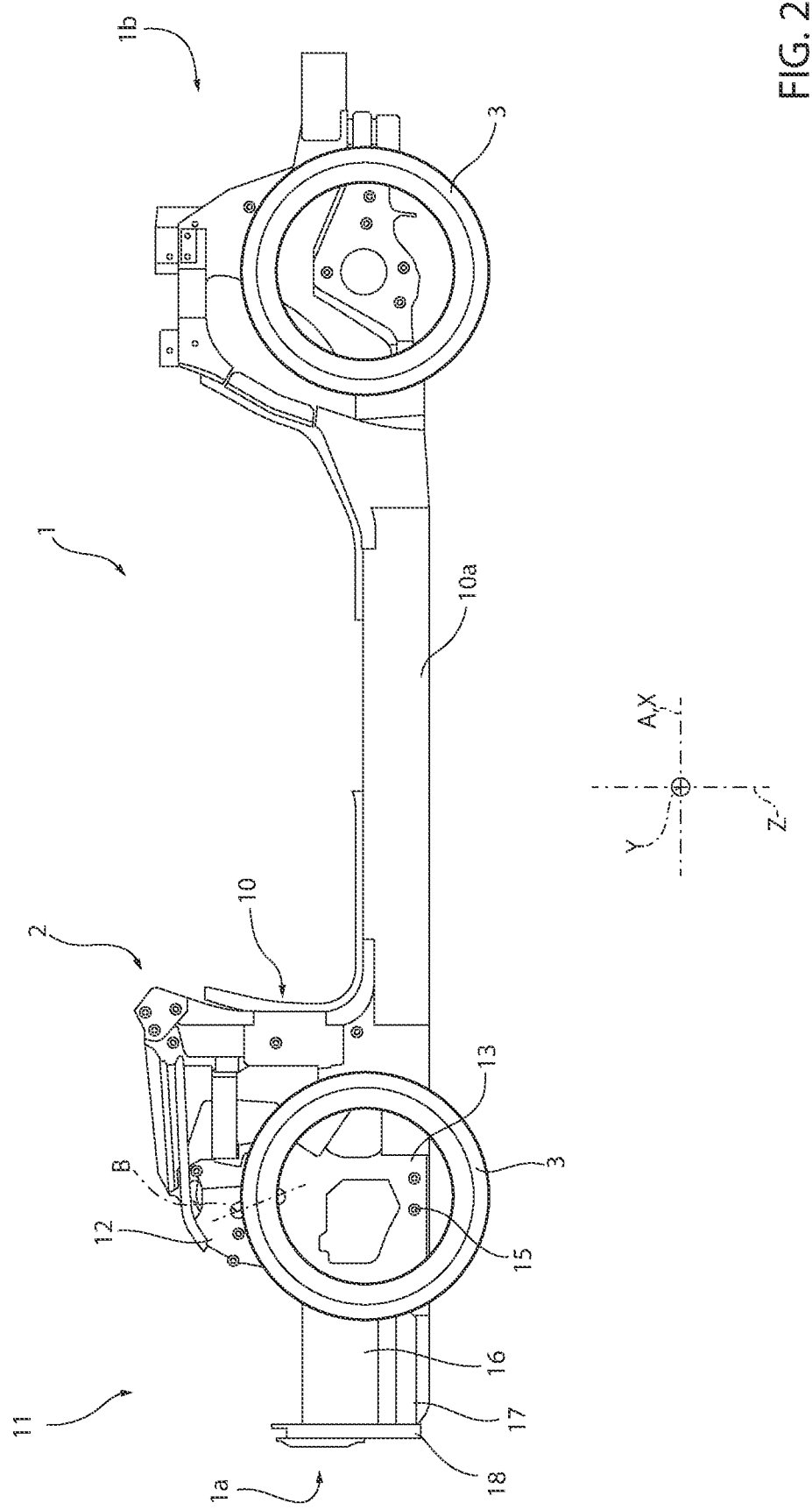
FIG. 2 is a side view of the motor vehicle shown in FIG. 1.

In FIG. 1, reference number 1 is used to indicate, as a whole, a motor vehicle comprising:
- a frame 2,
- a passenger compartment to accommodate at least one driver and/or one or more passengers, which is fixed relative to the frame 2;
- a plurality of wheels 3—only schematically shown in FIG. 2—which can rotate about respective rotation axes in order to move the frame 2 relative to the ground;
- a plurality of suspensions adapted to couple the wheels 3 to the frame 2 at variable relative distances along a direction Z of the vehicle 1, which, in use, is vertical relative to the ground; and
- a steering system configured to cause the rotation of one or more of the wheels 3 about respective axes, which are orthogonal to the rotation axes.

The passenger compartment, the suspensions and the steering system are known and, therefore, are not shown and described in detail hereinafter.

The vehicle 1 further comprises a front portion 1*a* and a rear portion 1*b* with respect to a forward moving direction A of the vehicle 1. The vehicle 1 also defines a longitudinal direction X, with respect to which the front portion 1*a* and the rear portion 1*b* are opposite one another.

In particular, the frame 2 comprises:
- a body cell 10, which defines or surrounds the passenger compartment; and
- a front frame assembly 11, which is fixed relative to the body cell 10 and is arranged at the front portion 1*a*.

The body cell 10 comprises, in turn, a floor board 10*a* oriented perpendicularly or substantially perpendicularly to the direction Z and extending between the front portion 1*a* and the rear portion 1*b* along the longitudinal direction X.

Without this implying any lack of generality, the vehicle 1 comprises a first electric motor at the front portion 1*a*, a second electric motor at the rear portion 1*b* and one or more batteries interposed between the first and the second motor along the longitudinal direction X and arranged under the floorboard 10a. The first motor, the second motor and the battery are known and, therefore, are not shown and described in detail hereinafter.

The assembly 11 comprises, in turn:
- a structure 12 called "shock tower" and adapted to serve as attachment for one or more of the suspensions; and
- a plurality of absorption elements 16, 17, which are adapted to deform in order to absorb front crashes of the motor vehicle 1.

More precisely, the assembly 11 comprises two structures 12 arranged at respective ends of the body cell 10 according to a direction Y orthogonal to the longitudinal direction X and to the direction Z. The structures 12 are parallel to one another and to the longitudinal direction X (FIG. 1).

The structures 12 project relative to the body cell 10 and, in particular, directly from the body cell 10.

The structures 12 preferably are identical to one another. For this reason, the description below will only disclose in detail one of the structures 12, provided that each feature described for one of the structures 12 also applies to the other structure 12.

The structures 12, if necessary, could also be considered or manufactured as one single structure 12.

In the specific case shown herein, the structure 12 comprises (FIG. 3):
- two planar surfaces 12a oriented perpendicularly to the direction Y, parallel to one another and opposite one another along the direction Y;
- a front side surface 12b interposed between the planar surfaces 12a along the direction Y and facing the front portion 1a; and
- a rear side surface 12c interposed between the planar surfaces 12a along the direction Y and facing the rear portion 1b.

The structure 12 also comprises two surfaces 12d, 12e opposite one another along the direction Z and interposed between the surface 12b and the surface 12c along the direction X. In addition, the surface 12d and the surface 12e are interposed between the planar surfaces 12a along the direction Y.

In detail, the surface 12d is flat and closer to the ground than the surface 12e along the direction Z. In other words, the surface 12b is arranged under the surface 12e.

The structure 12 further comprises:
- an attachment portion 13, where the structure 12 is fixed to the body cell 10, for example by means of releasable fixing means; and
- a plurality of attachment elements 15 (FIG. 2) configured to allow one or more suspensions to be coupled to the structure 12.

In particular, the attachment portion 13 is arranged at the surface 12c.

The structure 12 or, better said, each one of the structures 12 can preferably be manufactured as one single piece, for instance manufactured by means of a casting technique.

The structure 12 further comprises a through opening 25 parallel to the direction Y. Said opening 25 is adapted to be passed through by a component of the steering system, for example a steering tie rod.

In the specific case shown herein, the opening 25 has a polygonal shape and is obtained at the planar surfaces 12a.

Furthermore, the structure 12 is at least indirectly connected to the first electric motor, so that a deformation of the structure 12 corresponds to a shift of the first motor relative to the second motor.

As shown in FIGS. 1 and 2, the assembly 11 comprises an absorption element 16 and an absorption element 17 at each structure 12.

In detail, the absorption elements 16, 17 each comprise an extruded element, namely a box-like element, extending parallel to the longitudinal direction X. Hereinafter, reference will be made to one single absorption element 16 and to one single absorption element 17, since the absorption elements 16 are identical to one another, like the absorption elements 17.

The element 16 and the element 17 associated with a same structure 12 are parallel to one another and to the longitudinal direction X and are spaced apart from one another parallel to the direction Z. In detail, the element 16 and the element 17 are aligned with one another along the direction Y. More in detail, the element 16 is arranged above the element 17, so that the element 17 is closer to the ground along the direction Z during the use of the vehicle 1.

Furthermore, the element 16 and the element 17 are distinct from the structure 12 and are fixed thereto.

The element 16 and the element 17 extend starting from the structure 12, namely project relative to the structure 12. In detail, the elements 16 and 17 directly project from the structure 12 on the side opposite the attachment portion 13. More in detail, the elements 16 and 17 extend starting from different portions of the structure 12 at the surface 12b.

In the specific case shown herein, the cross section of the element 16 parallel to the longitudinal direction X is larger than the cross section of the element 17 parallel to the longitudinal direction X.

The absorption elements 16 and 17 are preferably obtained by means of a mechanical extrusion process.

The assembly 11 further comprises an absorption assembly 18 for the absorption of front crashes of the motor vehicle 1 extending transversely to the absorption elements 16 and 17 (FIGS. 1 and 2).

The assembly 18 has two ends 18a, 18b along the direction Y, which are fixed to the elements 16 and 17, respectively, at corresponding ends thereof, which are opposite relative to the structures 12 along the longitudinal direction X.

In the specific case shown herein, the absorption assembly 18 comprises (FIG. 1):
- a cross member 19 extending parallel to the direction Y and connecting the elements 16 and 17 associated with the two structures 12; and
- a cross member 20 also extending parallel to the direction Y and connecting the elements 16 and 17 associated with the two structures 12. Said cross member 20 is spaced apart from the cross member 19 along the direction Z.

The absorption assembly 18 further comprises two planar elements 21, 22 extending parallel to the direction Z and each arranged at a respective end of the cross members 19 and 20 along the direction Y. In other words, the cross members 19, 20 and the elements 21, 22 define a body with a rectangular shape.

The absorption assembly 18 can also comprise two reinforcement elements 23 arranged diagonally relative to the cross members 19, 20 and to the elements 21, 22. Said reinforcement elements 23 extend at the space portion delimited by the cross members 19 and 20 and by the elements 21 and 22 (FIG. 1).

The assembly 11 also comprises a cross member 24 arranged parallel to the direction Y between the two structures 12. Said cross member 24 is parallel to the cross members 19 and and is spaced apart from them along the longitudinal direction X.

Each structure 12 advantageously comprises an opening 30 with an elongated shape along a direction B, which is transversal to the directions X and Y, and a further opening 31 opposite the opening 30 relative to the opening 25. In detail, the opening 30 is arranged on the side of the surface 12e and the opening 31 is arranged on the side of the surface 12d relative to the opening 25.

Figure 3:
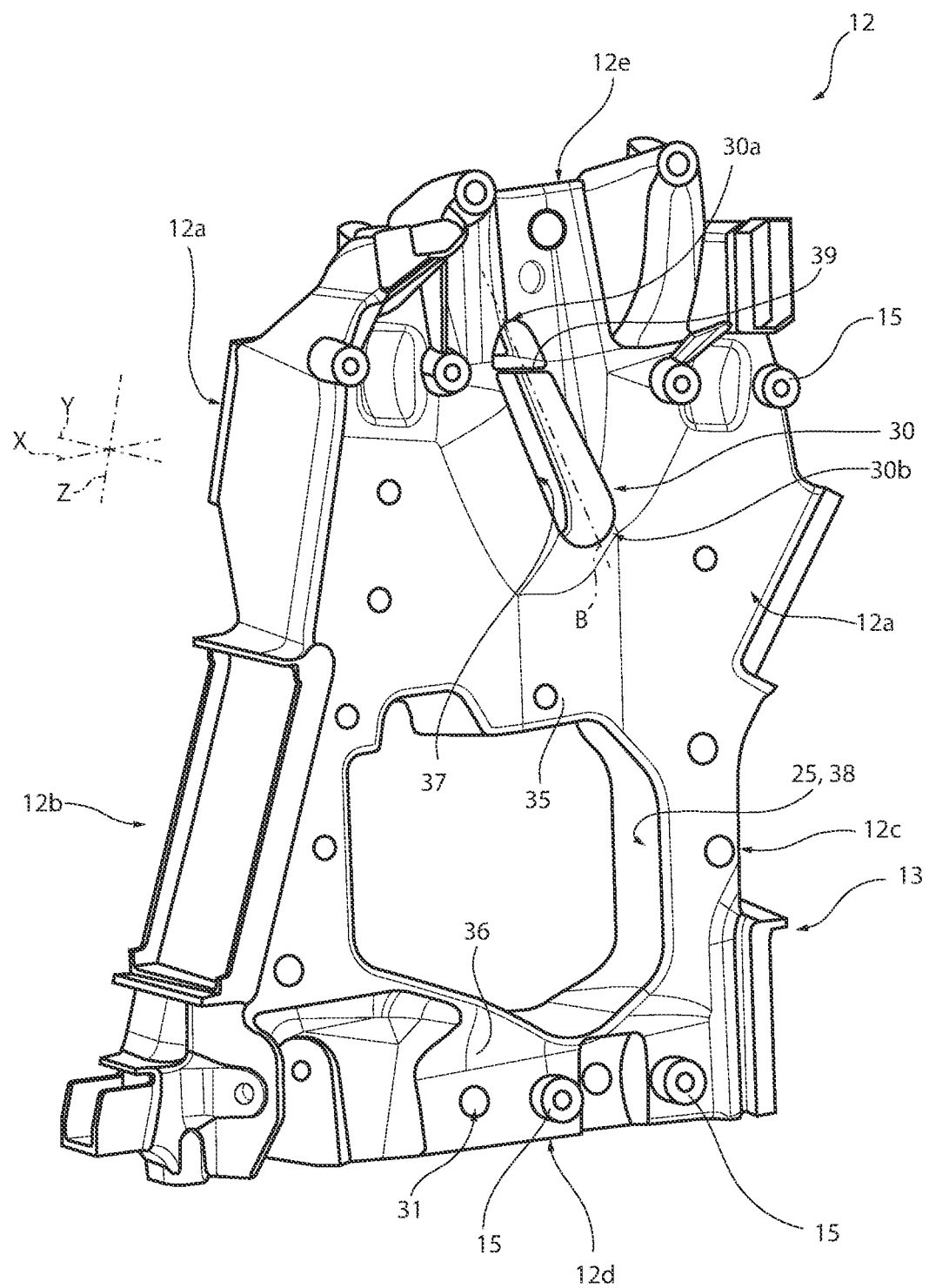
FIGS. 3 and 4 are a perspective view and a side view, respectively, of a component of the front frame assembly.
Figure 4:
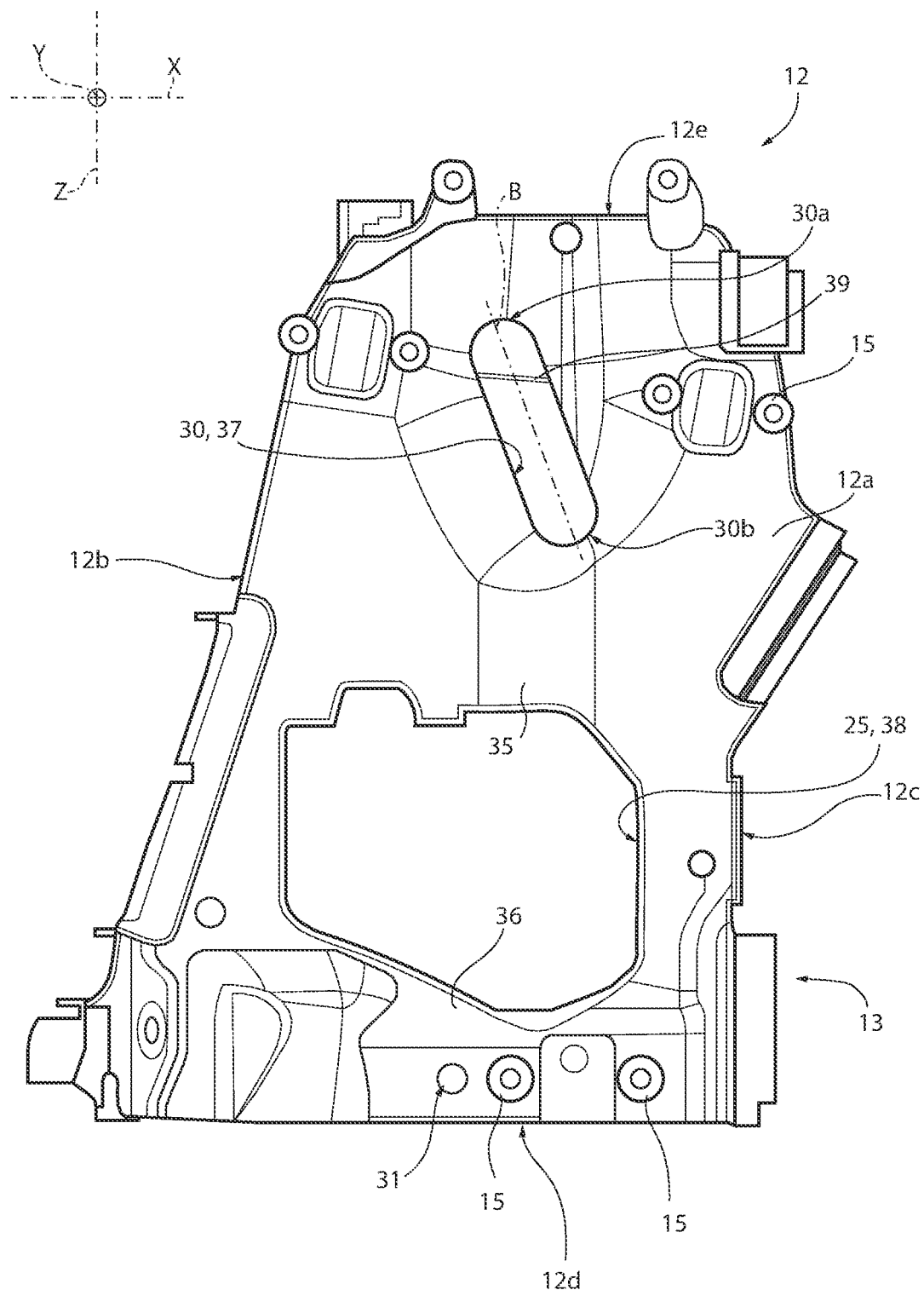

The opening 30 and the opening 31 allow mechanical stresses to be concentrated. More in detail, the structure 12 comprises a collapsible region 35 interposed between the opening 30 and the opening 25 and a collapsible region 36 interposed between the opening 31 and the surface 12d and/or between the opening 31 and the opening 25 (FIGS. 3 and 4). In detail, the term "collapsible" is meant in a relative manner with respect to the attachment portion 13, in particular meaning more collapsible than the attachment portion 13. The collapsible regions 35 and 36 comprise part of the planar surfaces 12a.

The orientation of the opening 30 allows the mechanical behaviour of the structure 12 to be guided, thus supporting the deformation in a preferential deformation direction.

Specifically, the direction B is parallel to the planer surfaces 12.

Moving along the direction X from the side surface 12b to the side surface 12c, namely in the direction oriented from the front portion 1a to the rear portion 1b, the opening comprises, one after the other, a first end 30a and a second end 30b opposite one another along the direction B. In detail, the distance of the first end 30a from the surface 12d is greater than the distance of the second end 30b from the surface 12d. In other words, the angle formed between the direction B and the longitudinal direction X on the side of the surface 12b, namely on the side of the front portion 1a, is acute.

More in detail, the structure 12 comprises surfaces 37 and 38, which extend between the planar surfaces 12a and define the opening 25 and the opening 30, respectively. Said surfaces 37 and 38 are cylindrical and are oriented parallel to the direction Y.

The opening 30 is preferably shaped like a buttonhole. Furthermore, in the embodiment shown herein, though not necessarily, the opening 30 comprises a rib 39 interposed between the first end 30a and the second end 30b along the direction B.

The rib 39 is oriented in an oblique manner relative to the direction X.

The opening 31 is a hole delimited by a cylindrical surface. The generatrix line of said cylindrical surface is preferably oriented transversally to the direction Y. This allows the deformability of the structure 12 to be controlled.

In use, in case of a front crash, the assembly 11 deforms so as to absorb the energy associated with the crash and in order to limit the deceleration of the vehicle 1 as much as possible. In detail, the elements 16 and 17 are compressed along the longitudinal direction X and, subsequently, the structure 12 deforms as well. More in detail, the structure 12 starts deforming from the collapsible regions 35 and 36.

The deformation of the structure 12 determines the shift of the first motor relative to the second motor. In detail, the first motor rigidly rotates around an axis of its own, which is parallel to the direction Y.

Owing to the above, the advantages of the assembly 11 according to the invention are evident.

Since the structure 12 comprises the opening 30, which is elongated along the direction B, and the opening 31, which is opposite the opening 30 relative to the opening 25, it is possible to foresee, with a high degree of likelihood, the tensile strength behaviour of the structure 12, which is generally obtained by means of casting processes. This allows the assembly 11 to absorb front crashes in an effective and repeatable manner and, at the same time, limits the front projection of the vehicle. As a matter of fact, the openings 30 and 31 define the collapsible regions 35 and 36, which constitute the points from which the yielding of the structure 12 is most likely to start in case a front crash.

In addition, since the structure 12 is at least indirectly connected to the first electric motor, in case of a front crash, the first motor rigidly rotates around an axis of its own, which is parallel to the direction Y. This reduces the translation of the first motor towards the second motor along the longitudinal direction X and limits the risk for the first motor of hitting the battery.

Finally, the assembly 11 according to the invention can clearly be subjected to changes and variants, which, though, do not go beyond the scope of protection defined by the appended claims.

The motor vehicle 1 could be a vehicle provided with a heat engine on the side of the rear portion 1b, for example a sports car.

In particular, the number and the shape of the components described and shown herein could be different and, in particular, could be changed with a great degree of freedom. More in particular, the assembly 11 could comprise one single structure 12 or more than two structures 12 and one single absorption element 16, 17 or more than two absorption elements 16, 17.

Furthermore, the structure 12 could comprise more than one opening 31.

The invention claimed is:

1. Front frame assembly (11) for a motor vehicle (1) comprising:
  at least one suspension attachment structure (12) connectable to a body cell (10) of said motor vehicle (1);
  said body cell (10) defining a passenger compartment of said motor vehicle (1); and
  at least one absorption element (16, 17) adapted to absorb the energy associated with a front crash of said motor vehicle (1); said absorption element (16, 17) being distinct from said structure (12), fixed with respect to said structure (12), and extending along a first direction (X);
  said structure (12) comprising a first opening (25) adapted to be passed through by a component of a steering system of said motor vehicle (1);
  characterized in that said structure (12) further comprises:
  a second opening (30) having an elongated shape along a second direction (B) transversal to said first direction (X); and
  at least one third opening (31) opposite said second opening (30) with respect to said first opening (25).

2. Frame front assembly according to claim 1, characterized by comprising:
  two planar surfaces (12a) directed perpendicularly to a third direction (Y) orthogonal to said first direction (X);
  said two planar surfaces (12a) being parallel to each other and opposite to each other along said third direction (Y);

a first surface (12*b*) and a second surface (12*c*) interposed between said planar surfaces (12*a*) along said third direction (Y) and spaced from each other along said first direction (X);

a third surface (12*d*) and a fourth surface (12*e*) interposed between said two planar surfaces (12*a*) along said third direction (Y) and spaced from each other along a fourth direction (Z); said fourth direction (Z) being orthogonal to said first and third direction (X, Y);

said first, second and third opening (25, 30, 31) being arranged at said planar surfaces (12*a*).

3. Front frame assembly according to claim 2, characterized in that said structure (12) comprises:

a first collapsible region (35) interposed between said first opening (25) and said second opening (30); and a second collapsible region (36) interposed between said third opening (31) and said third surface (12*d*).

4. Front frame assembly according to claim 2, characterized in that said third opening (31) is a hole delimited by a cylindrical surface;

wherein the generatrix line of said cylindrical surface is directed transversally to said third direction (Y).

5. Front frame assembly according to claim 2, characterized in that, proceeding along said first direction (X) from said first surface (12*b*) towards said second surface (12*c*), said second opening (30) comprises a first end (30*a*) and a second end (30*b*) opposite to each other along said second direction (B);

wherein the distance of said first end (30*a*) from said third surface (12*d*) is greater than the distance of said second end (30*b*) from said third surface (12*d*).

6. Front frame assembly according to claim 2, characterized in that said structure (12) comprises a fifth surface (37) and a sixth surface (38), which extend between said planar surfaces (12*a*) and respectively define said first opening (25) and said second opening (30);

said fifth and sixth surface (37, 38) being cylindrical and directed parallel to said third direction (Y).

7. Front frame assembly according to claim 1, characterized in that said second opening (30) is shaped like a buttonhole.

8. Motor vehicle (1) comprising:

a frame (2), a passenger compartment adapted to accommodate at least one driver and/or one or more passengers, which is fixed with respect to said frame (2);

a plurality of wheels (3) rotatable about respective first rotational axes to move said frame (2) with respect to the ground;

a plurality of suspensions adapted to couple said wheels (3) to said frame (2) at variable relative distance along said fourth direction (Z); and a steering system configured to cause rotation of one or more of said wheels (3) about respective second axes orthogonal to said first rotational axes;

said frame (2) comprising, in turn:

a body cell (10), which defines or surrounds said passenger compartment; and a front frame assembly (11) according to claim 1, which is fixed to said body cell (10).

9. Motor vehicle according to claim 8, characterized by comprising an electric motor at least indirectly connected to said structure (12) and at least one battery.

10. Motor vehicle according to claim 9, comprising a front portion (1*a*) and a rear portion (1*b*) with respect to an advancement direction (A) of said motor vehicle (1);

said motor vehicle (1) also comprising a further electric motor;

said electric motor being arranged at said front portion (1*a*) and said further electric motor being arranged at said rear portion (1*b*);

said at least one battery being arranged between said electric motor and said further electric motor parallel to said first direction (X).

\* \* \* \* \*